(12) United States Patent
Nakamoto

(10) Patent No.: US 11,558,519 B2
(45) Date of Patent: Jan. 17, 2023

(54) METHOD OF CONTROLLING AN IMAGE PROCESSING APPARATUS, AN IMAGE PROCESSING APPARATUS, AND A NON-TRANSITORY STORAGE MEDIUM THAT PRINT A PREDETERMINED IMAGE AND A PREDETERMINED MARK IN A PRINTING AREA ON A RECORDING MEDIUM

(71) Applicant: CANON KABUSHIKI KAISHA, Tokyo (JP)

(72) Inventor: Hiroshi Nakamoto, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/344,241

(22) Filed: Jun. 10, 2021

(65) Prior Publication Data

US 2021/0306495 A1    Sep. 30, 2021

Related U.S. Application Data

(63) Continuation of application No. 16/881,089, filed on May 22, 2020, now Pat. No. 11,064,082.

(30) Foreign Application Priority Data

May 29, 2019 (JP) .............................. JP2019-100721

(51) Int. Cl.
*H04N 1/40* (2006.01)
*H04N 1/00* (2006.01)

(52) U.S. Cl.
CPC ....... *H04N 1/00676* (2013.01); *H04N 1/0066* (2013.01); *H04N 1/00761* (2013.01)

(58) Field of Classification Search
None
See application file for complete search history.

(56) References Cited

U.S. PATENT DOCUMENTS 7,336,912 B2 ‡  2/2008  Yamauchi .............. B26D 5/007
                                                            399/385
8,189,230 B2 ‡  5/2012  Yamaguchi ............ H04N 1/387
                                                            358/1.18

(Continued)

FOREIGN PATENT DOCUMENTS

JP    2012-058303 A      3/2012
JP    2012058303  A  ‡   3/2012

*Primary Examiner* — Dung D Tran
(74) *Attorney, Agent, or Firm* — Venable LLP

(57) ABSTRACT

A method of controlling an image processing apparatus. the method includes accepting a predetermined instruction regarding a predetermined image that is being displayed on the image processing apparatus, changing, in a case when the predetermined instruction is accepted, so that a predetermined mark added to the predetermined image does not overlap with a non-printing area corresponding to an area where printing is not to be performed, a location of the predetermined image based on the predetermined mark, and executing a process of printing the predetermined image and the predetermined mark in the printing area corresponding to an area where printing is to be performed on a recording medium.

23 Claims, 9 Drawing Sheets

(56) References Cited

U.S. PATENT DOCUMENTS

| | | | |
|---|---|---|---|
| 2005/0281184 A1* | 12/2005 | Sakata | B26D 7/27 369/47.1 |
| 2006/0269311 A1* | 11/2006 | Yamauchi | G03G 15/502 399/82 |
| 2008/0239381 A1‡ | 10/2008 | Oshima | G06F 3/1262 358/1.15 |
| 2009/0297247 A1‡ | 12/2009 | Yaguchi | B41J 3/44 400/621 |
| 2011/0149315 A1‡ | 6/2011 | Yamazaki | H04N 1/0044 358/1.9 |
| 2013/0057922 A1‡ | 3/2013 | Shimizu | G06K 15/1868 358/1.18 |
| 2014/0064882 A1‡ | 3/2014 | Sato | G06F 3/125 412/19 |
| 2014/0253936 A1‡ | 9/2014 | Mizuguchi | G06F 3/1285 358/1.13 |
| 2015/0253710 A1‡ | 9/2015 | Tomita | G03G 15/0415 399/86 |
| 2017/0344861 A1‡ | 11/2017 | Shirasaka | B41J 5/32 |
| 2018/0115656 A1‡ | 4/2018 | Noda | H04N 1/0066 |
| 2019/0311233 A1‡ | 10/2019 | Kouguchi | B41J 11/46 |
| 2019/0361647 A1‡ | 11/2019 | Nakamoto | G06F 3/1208 |

\* cited by examiner
‡ imported from a related application

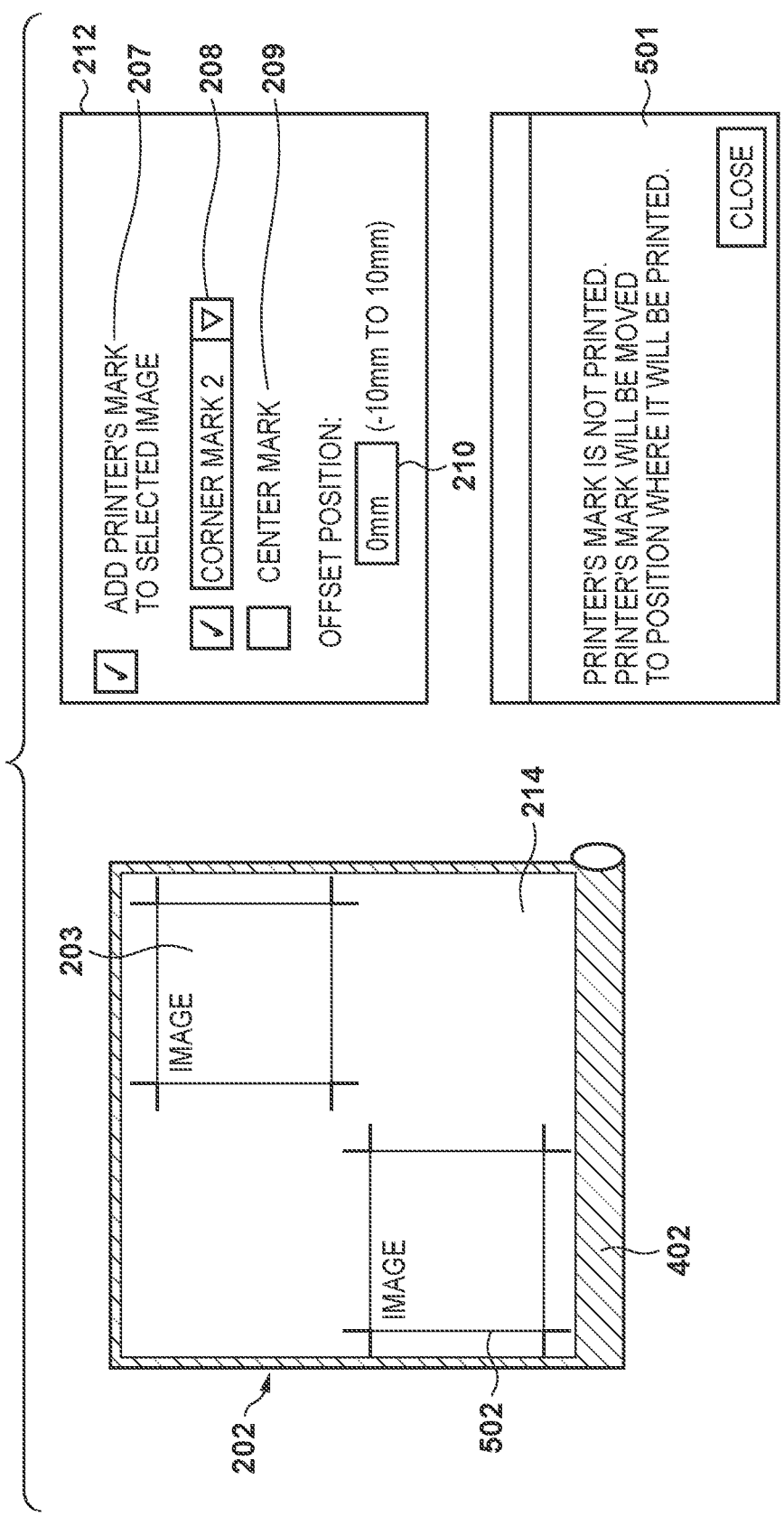

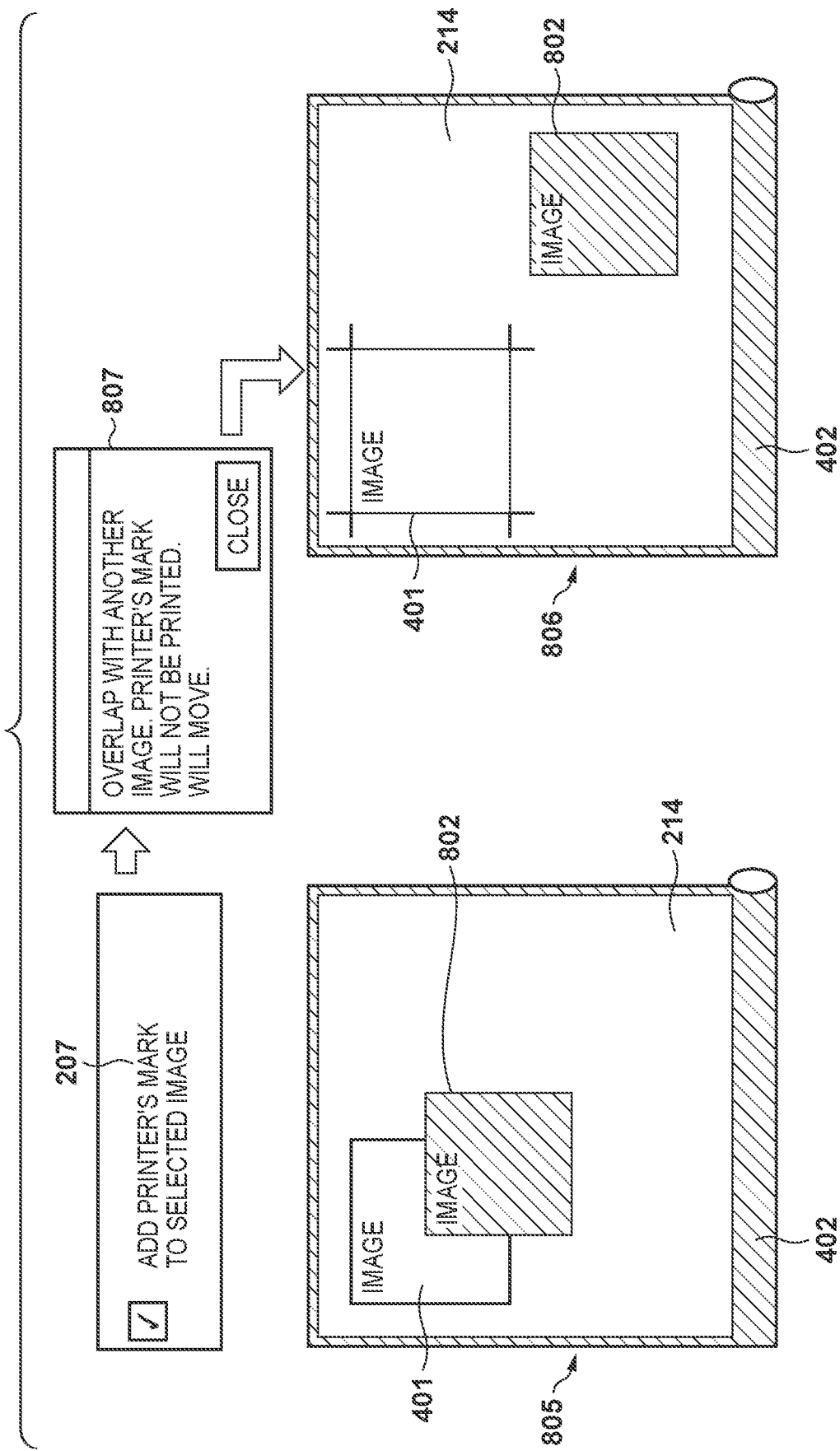

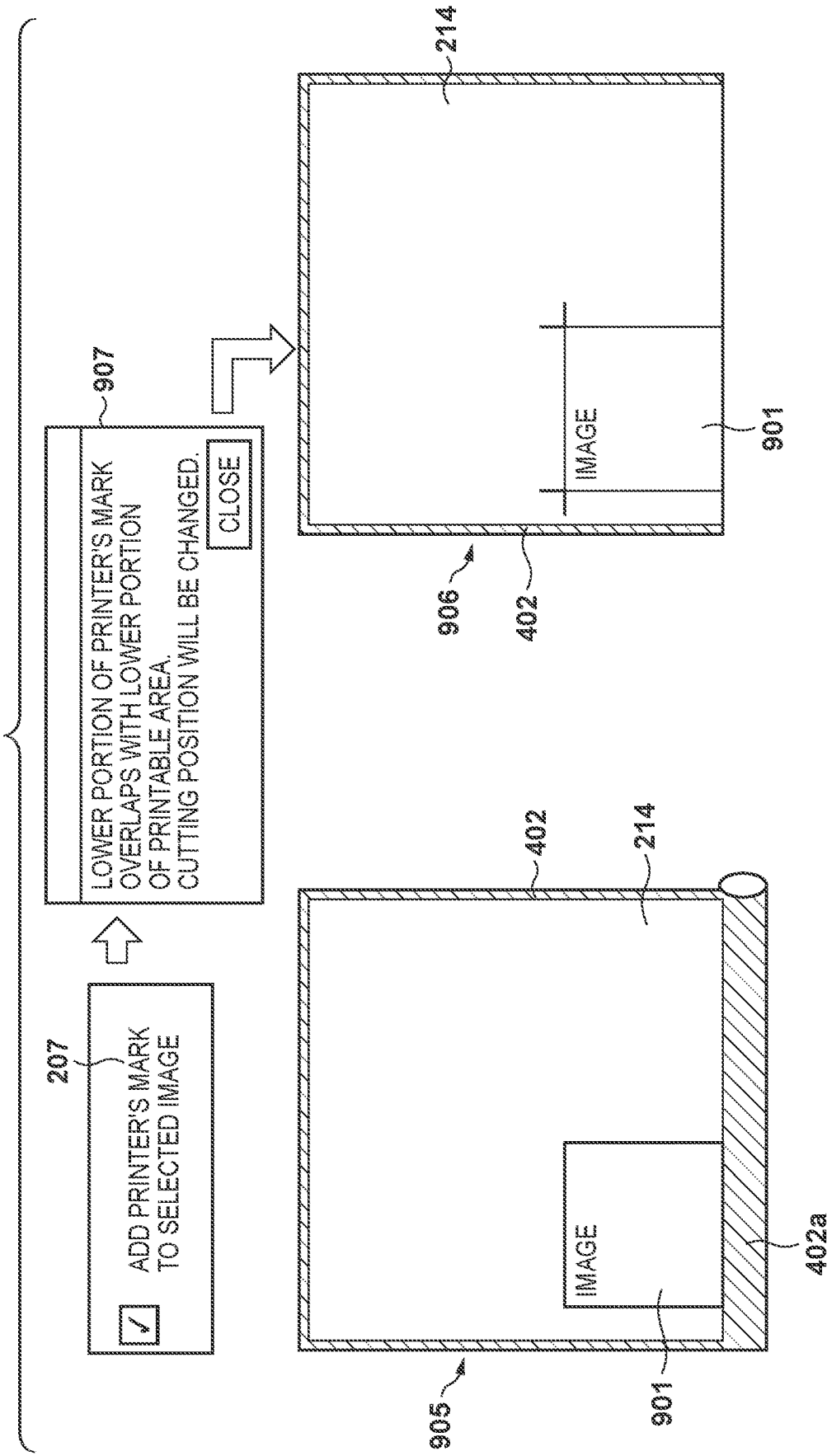

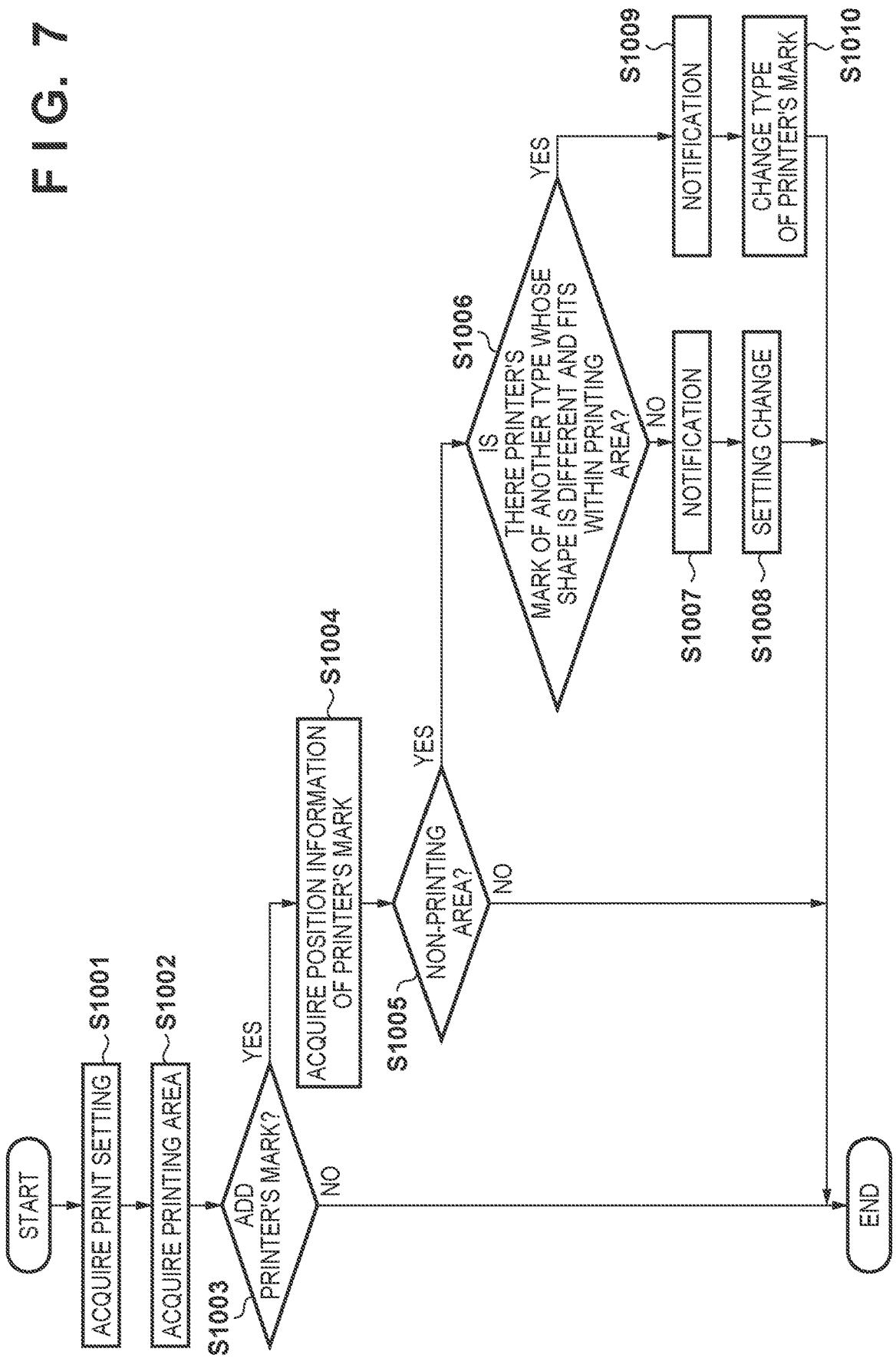

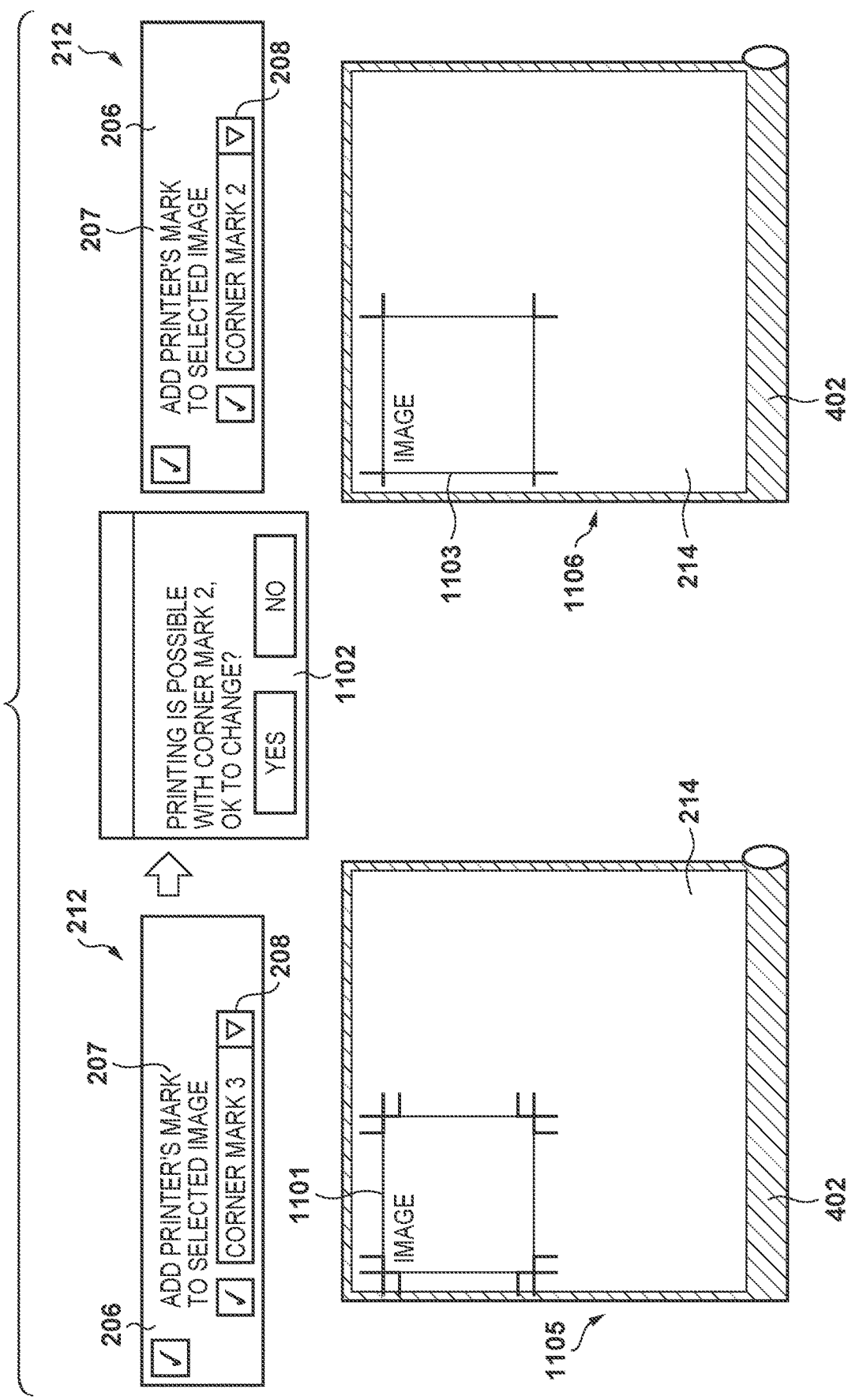

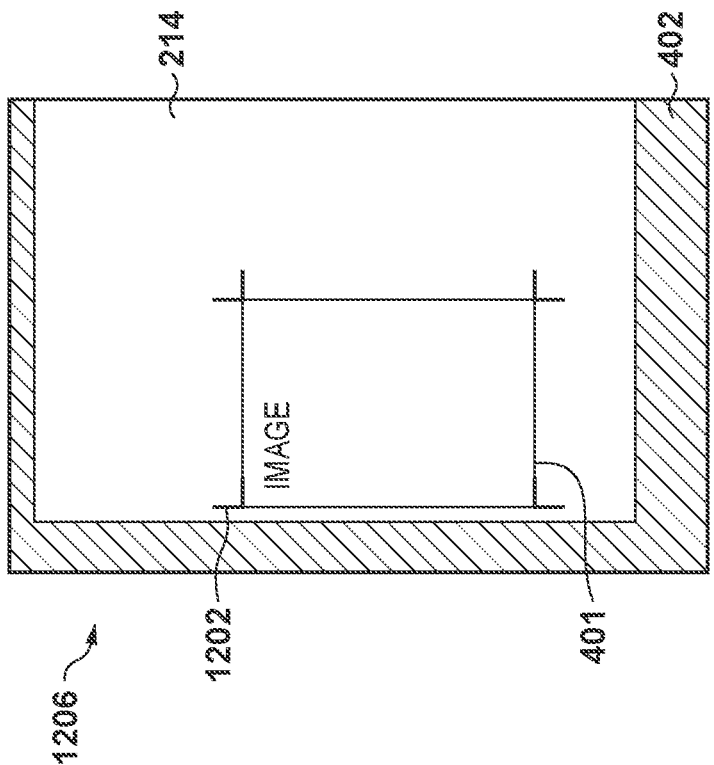
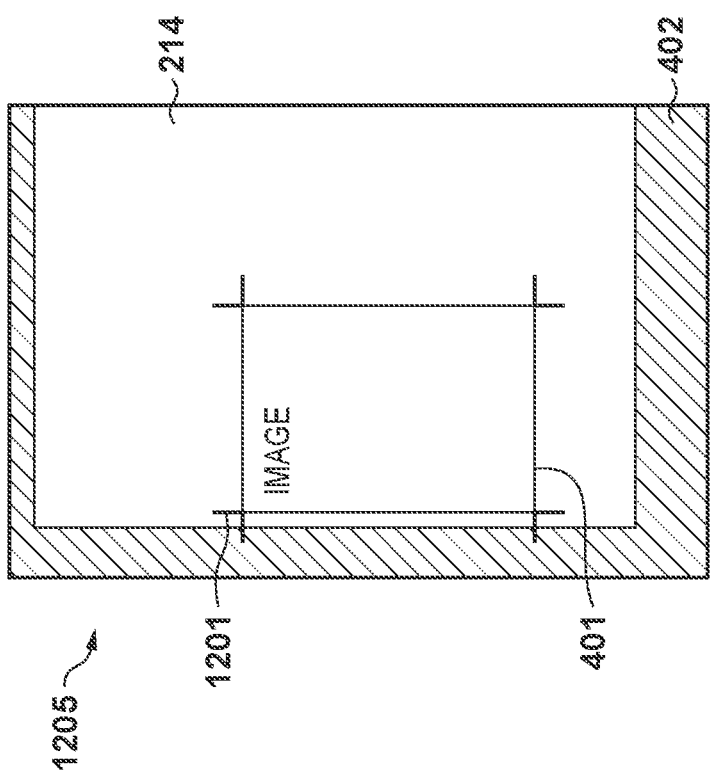

METHOD OF CONTROLLING AN IMAGE PROCESSING APPARATUS, AN IMAGE PROCESSING APPARATUS, AND A NON-TRANSITORY STORAGE MEDIUM THAT PRINT A PREDETERMINED IMAGE AND A PREDETERMINED MARK IN A PRINTING AREA ON A RECORDING MEDIUM

This application is a continuation application of U.S. patent application Ser. No. 16/881,089, filed May 22, 2020, which claims the benefit of Japanese Patent Application No. 2019-100721, filed May 29, 2019, each of which is hereby incorporated by reference herein in its entirety.

BACKGROUND OF THE INVENTION

Field of the Invention

The present invention relates to a method of controlling an image processing apparatus.

Description of the Related Art

In recent years, with the advent of large printers using roll paper, opportunities for producing a work by printing an image on a large sheet and then cutting or the like have been increasing. In a case where cutting will be performed after printing, printing may be performed after adding a printer's mark serving as a guide for a cutting position to each image. Japanese Patent Laid-Open No. 2012-58303 discloses a process in which, if a printer's mark overlaps a no-printing area of a sheet end and the printer's mark will not be printed, a printing area is enlarged such that the printer's mark is printed.

SUMMARY OF THE INVENTION

According to one embodiment of the present invention, a method of controlling an image processing apparatus operable to display a first image, the method comprises: accepting a predetermined instruction for adding a predetermined mark to the first image which is being displayed, wherein, when the predetermined instruction is accepted, the predetermined mark is added to a predetermined location in a vicinity of the first image; and based on at least one of a non-printing area corresponding to an area on a recording medium where printing is not to be performed and a second image being positioned at the predetermined location when the predetermined instruction is accepted, causing at least one of the first image and the second image to move, wherein the at least one, that was positioned at the predetermined location when the predetermined instruction was accepted, of the non-printing area and the second image is not positioned at the predetermined location after at least one of the first image and the second image has been moved.

According to another embodiment of the present invention, a method of controlling an image processing apparatus operable to display a first image, the method comprises: accepting an instruction, being accepting a moving instruction for moving the first image which is being displayed and to which a predetermined mark has been added; and based on at least one of a second image and a non-printing area, which corresponds to an area where printing is not to be performed on a recording medium, being positioned at a location where the predetermined mark added to the first image is positioned after the first image is moved in accordance with the moving instruction, causing at least one of the first image and the second image to move, wherein the at least one, that was positioned at a location where the predetermined mark added to the first image is positioned after the first image is moved in accordance with the moving instruction, of the non-printing area and the second image is not positioned at the location where the predetermined mark added to the first image is positioned after at least one of the first image and the second image is moved.

Further features of the present invention will become apparent from the following description of exemplary embodiments (with reference to the attached drawings).

BRIEF DESCRIPTION OF THE DRAWINGS

FIG. 4 is a diagram showing an example of display of a notification and a page display area according to an embodiment.

FIG. 5 is a diagram showing an example of display of a page display area according to an embodiment.

FIG. 6 is a diagram showing an example of display of a page display area according to an embodiment.

FIG. 7 is a flowchart illustrating an example of processing of an application according to an embodiment.

FIG. 8 is a view that shows a display example of a page display area and a printer's mark setting part according to an embodiment.

FIG. 9A is a diagram showing an example of display of a page display area according to an embodiment.

FIG. 9B is a diagram showing an example of display of a page display area according to an embodiment.

DESCRIPTION OF THE EMBODIMENTS

Figure 1:
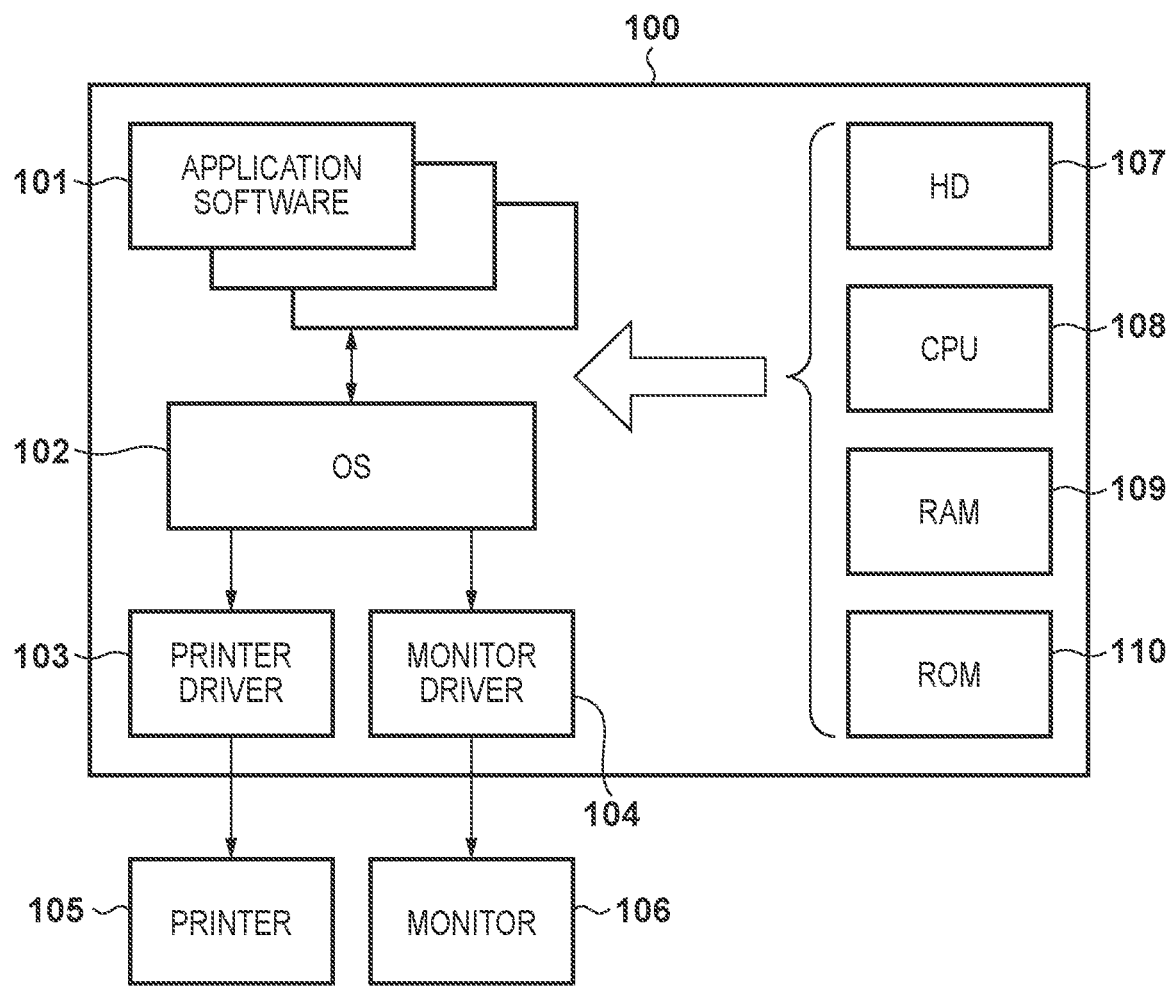
FIG. 1 is a diagram showing an exemplary configuration of a host computer as an image processing apparatus according to an embodiment.

However, for example, when a printer's mark is added to an image and the printer's mark protrudes from a sheet, the above-mentioned conventional technique cannot print the protruding portion. In such a case, in the above-mentioned conventional technique, it is necessary to have a user move the printer's mark or the image to a position where there is no protrusion from the printing area while they check a print preview, which generates an operation burden on the user.

An embodiment of the present invention provides a technique for reducing a user's operation burden when a printer's mark is added to an image.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<Apparatus Configuration>

FIG. 1 is a diagram showing an exemplary configuration of a host computer 100 as an image processing apparatus according to the present embodiment. The host computer 100 of the present embodiment is any type of an image processing apparatus capable of image processing, and can be realized by various modes of apparatuses such as a personal computer, a server, a smart phone, and a tablet terminal.

The host computer 100 includes hardware such as a CPU 108, a hard disk (HD) 107, a RAM 109, and a ROM 110. These are connected to each other via an internal bus (not shown). The CPU 108 controls the operation of the host computer 100 by reading a program stored in the ROM 110 into the RAM 109 and executing the program. The RAM 109 is used as a temporary storage area when the CPU 108 performs various processes. The ROM 110 or the hard disk (HD) stores, for example, an operating system (OS) 102, application software 101 to be described later, and the like. The host computer 100 is connected to a printer 105 and a monitor 106, which are external apparatuses, for example, via an external I/F (not shown). Note that the host computer 100 may be directly connected to the monitor 106 and the printer 105 by a cable or the like, or may be connected via a wired or wireless LAN or the like.

The host computer 100 has an application 101 (hereinafter referred to as application 101), an OS (operating system) 102, a printer driver 103, and a monitor driver 104 as its software configuration. For example, the host computer 100 includes one or more applications 101, such as a word processor, spreadsheet, Internet browser, or a combination thereof.

The application 101 is an application program for editing an image to be printed. Specifically, the application 101 executes a predetermined process, and issues various drawing process instruction sets (such as an image drawing instruction, a text drawing instruction, or a graphics drawing instruction) for generating an image that displays a result of executing the process. A drawing process instruction set issued by the application 101 is inputted to the monitor driver 104 via the OS 102. When the drawing process instruction set relates to printing, the drawing process instruction set is also inputted to the printer driver 103 via the OS 102. The printer driver 103 is software for processing an inputted drawing processing instruction set to create print data, and causing the printer 105 to print the print data. The monitor driver 104 is software for processing an input drawing processing instruction set and displaying an image on the monitor 106.

In accordance with the application 101, the host computer 100 generates output image data using text data classified into text such as characters, graphics data classified into graphics such as a diagram, image data classified into photographic images or the like. The output image data is displayed on the monitor 106. When printing an image based on the output image data, the application 101 requests the OS 102 for print output. At this time, a drawing instruction group in which a text data portion is configured by a text drawing instruction, a graphics data portion is configured by a graphics drawing instruction, and an image data portion is configured by an image drawing instruction is issued to the OS 102.

Example of Screen Configuration

Figure 2:
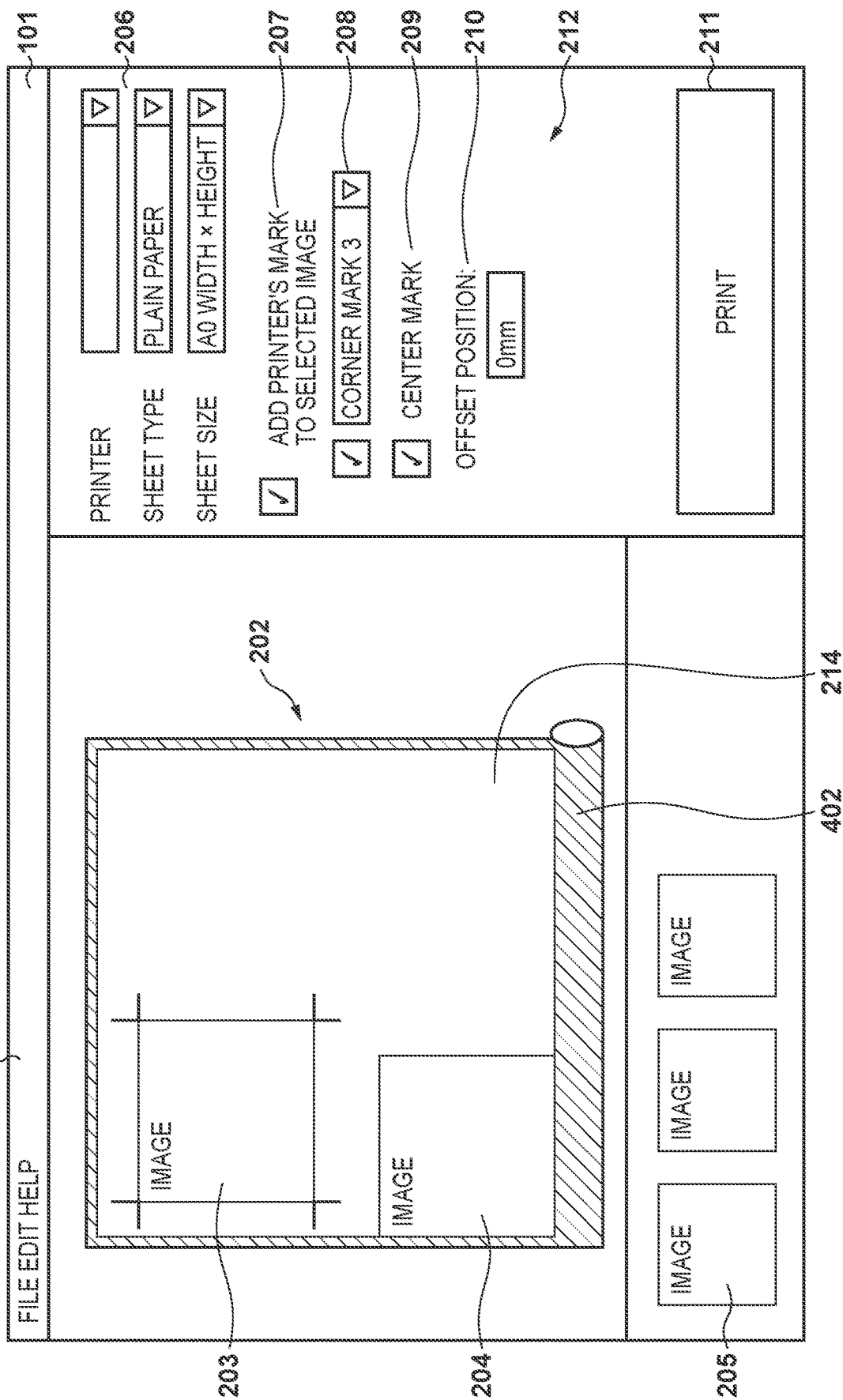
FIG. 2 is a diagram showing an example of a screen configuration having a function of arranging and editing an image on a page according to an embodiment.

FIG. 2 is a diagram showing an example of a configuration of an editing screen having a function of arranging and editing an image on a page, which is realized by the application 101 described above. The application 101 is, for example, output image data creation software for creating image output data in which a printer's mark is added to an image which is to be printed. For example, in this software, output image data is displayed on an editing screen, and an image to be printed that is laid out on the output image data can be edited in accordance with a user operation. In this example, the editing screen includes a menu operation part 201, a page display area 202, a thumbnail image display area 205, a print setting part 206, a printer's mark setting part 212, and a print button 211.

The menu operation part 201 is an area for accepting a user's selection of a function such as termination of the application 101, image addition specification on a page, and editing. When the user selects a command displayed on the menu operation part 201, a respective function is executed by the application 101. For example, the user can select an image to be arranged on the page display area 202 from the file menu of the menu operation part 201. The selected image is arranged in the page display area 202, and setting such as adding a printer's mark to the image arranged in the page display area 202 is performed.

The page display area 202 displays an image 204 arranged on a page or a printer's mark-containing image 203 to which a printer's mark has been added in accordance with a user's setting. That is, a preview image of the printed matter is displayed. An image can be selected, for example, by a pointing device, and settings for the selected image can be made on the page. For example, a setting for, for example, movement, enlargement or reduction of a selected image or addition of a printer's mark, which will be described later, can be executed on the page display area.

The page display area 202 displays a printing area 214 representing an area to be actually printed on a page and a non-printing area 402 representing an area not actually to be printed on the page. That is, the printing area 214 corresponds to an area where recording (printing) is performed on the recording medium, and the non-printing area corresponds to an area where recording (printing) is not performed on the recording medium. Although it is possible to arrange an image in the non-printing area 402 on the editing screen, even if printing is instructed in this state, printing is not performed regarding an area overlapping with the non-printing area 402. The non-printing area 402 is a margin area secured to prevent the inside of the apparatus from becoming dirty when, for example, a deviation between the recording medium and the image to be formed occurs or when the amount of toner is large. In the present embodiment, the page display area 202 displays a page for roll paper. However, a page for cut paper including a standard sheet such as A3 and A4 may be displayed.

The thumbnail image display area 205 displays a thumbnail image. For example, an image stored in the hard disk (HD) 107 can be displayed. When a folder is specified by a user operation, a thumbnail image of an image stored in the folder may be displayed. For example, a user can select an image to be printed from among images displayed in thumbnail image display areas 205, and add the image from the menu operation part 201 to thereby cause the image to be displayed in the page display area 202. In addition, for example, configuration may be taken so that it is possible to cause the page display area 202 to display an image displayed in the thumbnail image display area 205 in accordance with dragging and dropping.

The printer's mark setting part 212 accepts a setting for a printer's mark to be added to an image selected on the editing screen. Note that the printer's mark setting part 212 may accept not only the printer's mark to be added to the image selected on the editing screen, but also settings regarding a plurality of printer's marks to be respectively added to all the images displayed on the editing screen, for example. The addition selection part 207 accepts an operation for deciding whether to add a printer's mark to the image selected on the editing screen from the user. For example, the addition selection part 207 is a check box. For example, when the check box is set to be on, adding a printer's mark to an image selected on the editing screen is decided. Then, the type selection part 208, the center mark selection part 209, and the offset position setting part 210 can accept the user operation. The type selection part 208 accepts a selection of a type of printer's mark to be added to an image selected on the editing screen. In addition, the center mark selection part 209 accepts an operation for deciding whether to add a center mark to the image selected on the editing screen from the user. In addition, the offset position setting part 210 accepts a setting for an offset position for a printer's mark to be added to an image selected on the editing screen. With such a mode, in response to the addition selection part 207 accepting an operation for adding the printer's mark in a state in which any one of the images in the page display area 202 is selected, the page display area 202 displays the printer's mark-containing image 203 in which the printer's mark has been added to the selected image.

Here, a printer's mark is a guide (mark) added to the image to be printed. For example, the corner mark is a guide indicating a cutting position for a time of cutting out an image area from a printed recording medium. Further, for example, a center mark is a guide indicating the top, bottom, left, and right directions of the printed image.

The print setting part 206 accepts a user operation for various settings relating to printing such as a printer, a sheet type, and a sheet size. When the print setting part 206 accepts a user operation, the page display area 202 displays, for example, a result changed in accordance with the accepted settings of the printer, the sheet type, the sheet size, and the like. The page display area 202 accepts an editing operation of image data laid out on a page. The print button 211 accepts an instruction to execute printing in accordance with a user operation. When the print button 211 is pressed, the application 101 issues various drawing processing instructions based on the output image data being displayed in the page display area 202. Then, when the various drawing processing instruction sets are inputted to the printer driver 103 via the OS 102, the printer driver 103 processes the inputted drawing processing instruction sets to generate print data. The printer 105 receives the print data, and executes printing based on the received print data.

As described above, the page display area 202 includes the printing area 214 and the non-printing area 402. When printing is instructed in a state where the printer's mark added to the image overlaps with the non-printing area 402, the printer's mark which overlaps with the non-printing area 402 is not printed. For example, if a printer's mark is not printed because printing is instructed while the printer's mark is overlapped with the non-printing area 402, convenience is lowered for a user who wants to use the printer's mark in the printed matter. In addition, for example, a mode in which a user makes manual changes so as to not have overlap with the non-printing area 402 in order to print a printer's mark is cumbersome for the user. Therefore, a description will be given below of a mode in which the arranged image itself fits within the printing area 214, but even when a printer's mark added to the image protrudes into the non-printing area 402, the printer's mark can be printed more easily and user convenience is improved.

Processing Example

Figure 3:
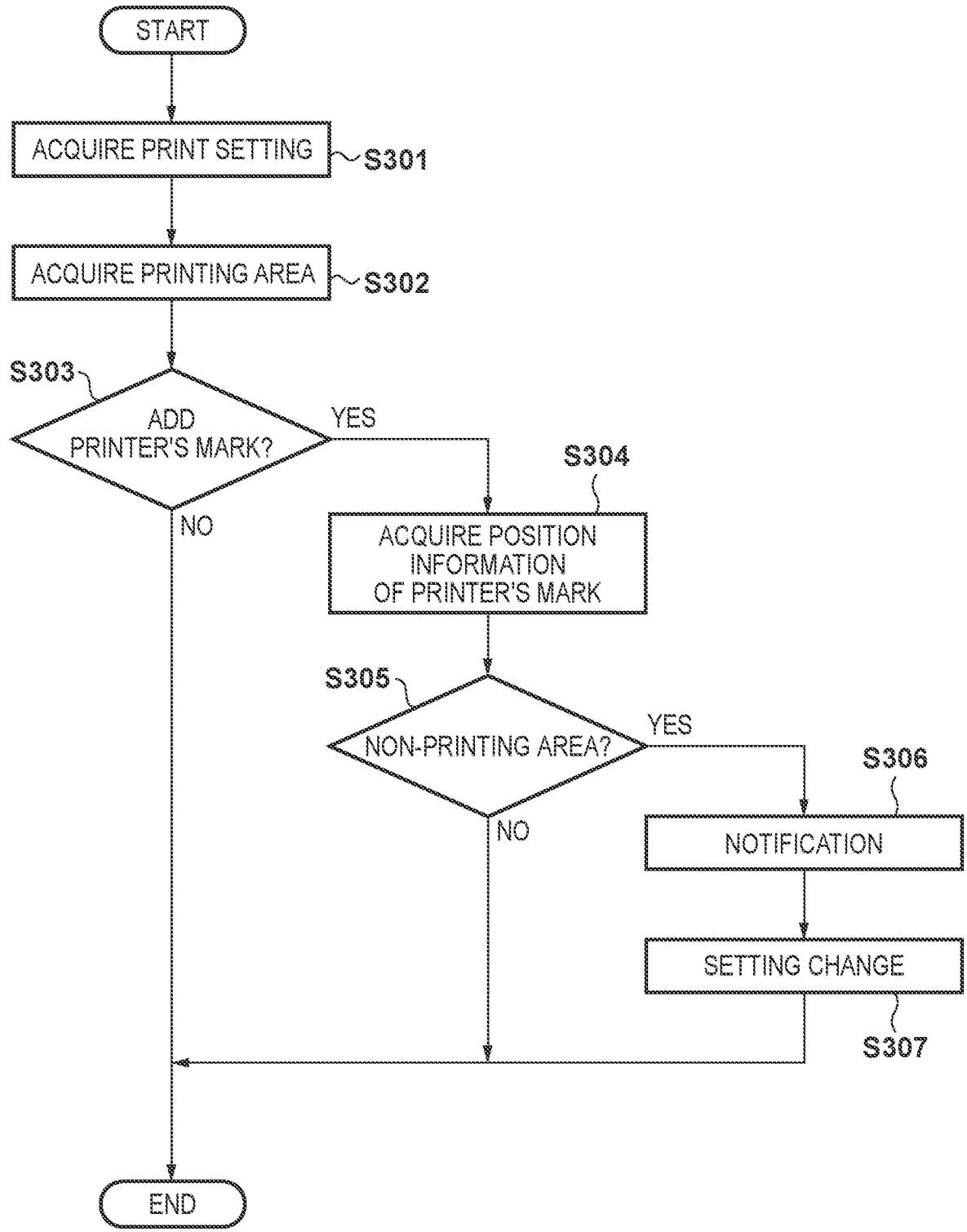
FIG. 3 is a flowchart illustrating an example of processing of an application according to an embodiment.

FIG. 3 is a flowchart showing an example of processing performed by the application 101 when a printer's mark is added to an image arranged in the page display area 202 in FIG. 2. For example, this flow chart is realized by the CPU 108 reading the application 101 stored in the ROM 110 into the RAM 109 and executing it. For example, the CPU 108 starts the present processing if a selection of an image to be arranged on the page display area 202 is performed from the file menu of the menu operation part 201.

In step S301, the CPU 108 acquires information that is set by the print setting part 206. The information set by the print setting part 206 includes, for example, information necessary for deciding a printing area, such as a printer for executing a job, a sheet type, a sheet size, and the like. Thereafter, in step S302, the CPU 108 acquires a printing area decided based on the information acquired in step S301.

In step S303, the CPU 108 checks whether to add a printer's mark to the selected image. In the present embodiment, the CPU 108 checks the status of the check box of the addition selection part 207. If the check box is on (YES in step S303), the CPU 108 adds a printer's mark to the selected image in the page display area 202 and proceeds to step S304. Here, a state in which a printer's mark is added is indicated by the printer's mark-containing image 203. If the check box is off (NO in step S303), the CPU 108 ends the flow chart. When the determination of step S303 is NO, the CPU 108 may return to step S301 and repeat the process while the selection of images continues. That is, the CPU 108 may wait for the user to turn on the check box of the addition selection part 207, add a printer's mark based on the fact that the check box is turned on, and advance the processing to step S304.

In step S304, the CPU 108 acquires position information regarding the position of the location of the printer's mark in the printing area when the printer's mark is added to the selected image. In step S305, the CPU 108, based on the position information acquired in step S304, determines whether the printer's mark overlaps the non-printing area 402 (see FIG. 4). In the present processing example, the non-printing area 402 is, for example, a margin area of an end of a page. If the printer's mark does not overlap the non-printing area 402 even if the printer's mark is added to the selected image (NO in step S305), the CPU 108 adds the printer's mark to the selected image and ends the processing of the present flow chart. In contrast, when a printer's mark is added to the selected image and the printer's mark overlaps the non-printing area 402 (YES in step S305), the CPU 108 proceeds to step S306 and executes a notification. The notification performed here is more specifically, for example, a process of notifying a user that a setting change for the selected image is to be performed. After that, in step S307, the setting is changed so that the printer's mark fits within the printing area, and the present flow chart is terminated. Specifically, the setting change is, for example, a process of moving the selected image in the printing area. Note that the selected image is moved, for example, so that the selected image does not overlap with other images. For example, the movement is performed so as to eliminate overlap between the printer's mark and another image or a non-printing area. Further, in the present embodiment, the addition of the printer's mark to the selected image is usually performed in a state in which the selected image does not overlap the non-printing area 402 or another image. Therefore, the notification and the setting change are performed in a state in which the selected image does not overlap with the non-printing area 402 or other images, and only the printer's mark added to the selected image overlaps with the non-printing area 402 or other images. Note that even when an instruction to add a printer's mark to the selected image is given in a state where the selected image overlaps the non-printing area 402, since both the image and the printer's mark overlap the non-printing area 402, the notification and the setting change are performed as a matter of course.

As described above, the CPU 108 changes the setting of the layout of the selected image so that the printer's mark added to the selected image fits within the printing area 214, that is, so that the printer's mark does not overlap with the non-printing area 402. Because the layout of the added printer's mark is also changed in accordance with change in the layout of the selected image, the printer's mark fits within the printing area 214.

It should be noted that the determination in step S305 may be YES, for example, if the printer's mark overlaps the non-printing area 402 partially (at least partially). However, configuration may be taken such that, even if the printer's mark partially overlaps the non-printing area 402, if the degree of overlap is small, "NO" is determined in step S305 and the processing ends. More specifically, configuration may be taken to specify the length of the printer's mark overlapping the non-printing area 402, and if the specified length is equal to or less than a predetermined threshold value, make a determination of NO in step S305. The determination of step S305 is performed prior to the actual addition of the printer's mark to the selected image, but configuration may be taken to determine whether or not the printer's mark actually added overlaps the non-printing area 402 after the actual addition of the printer's mark to the selected image.

The notification in step S306 may be omitted. The configuration of the process from the notification (step S306) to the setting change (step S307) can be designed as appropriate. For example, configuration may be taken to display, together with the notification, a button or the like that allows a selection in accordance with a user operation of whether or not to a layout change should be made so that a printer's mark can be printed, and change the setting in step S307 only when the layout change is accepted in accordance with the user operation. For example, the CPU 108 may accept an instruction from a user and change the setting when a moving instruction is accepted.

In addition, even when the setting is changed in step S307, the processing may return to step S301 and repeat the processing of this flow chart while the selection of the target images continues. As a result, for example, even when an image to which a printer's mark has already been added is moved or the print setting is changed, and the printer's mark that had fit in the printing area 214 overlaps the non-printing area 402, the setting can be changed again in step S307. In the present embodiment, the above notification and the setting change are of course performed also when both the image and the printer's mark overlap the non-printing area 402 as a result of the movement of the image, but they are also performed when only the printer's mark overlaps the non-printing area 402 in a case where the image does not overlap the non-printing area 402.

Hereinafter, description is given for a display example of the page display area 202 and the printer's mark setting part 212 when the processing of the flowchart of FIG. 3 is executed. FIG. 4 is a view for showing another example of the page display area 202 and the notification in step S306. In the case of FIG. 4, a warning message is displayed in a warning message dialogue 501 in the notification in step S306. Upon accepting that the close button of the warning message dialogue 501 has been pressed, the CPU 108 moves the selected image 401 to a position where the printer's mark fits within the printing area 214. As a result, it is possible to execute the setting change of step S307 after the user has recognized that the layout has been changed.

As described above, according to the present embodiment, if a printer's mark, which is added to the selected image 401, overlaps the non-printing area 402, in accordance with movement of the selected image 401, the layout of the printer's mark is changed and the printer's mark ceases to overlap the non-printing area 402. Therefore, the operation burden on the user can be reduced.

Second Embodiment

In the first embodiment, as an example of a case where the printer's mark is in the non-printing area 402, description was given regarding processing in the case where the printer's mark overlaps the margin area of the sheet. However, a problem also arises in a case where a printer's mark overlaps, not with a margin area, but with another image different from the image to which the printer's mark was added. More specifically, when a printer's mark overlaps with another image in the printing area 214, it is necessary to cut this other image when performing cutting with the printer's mark as a guide. Further, for example, a part of this other image is overwritten by the printer's mark, and visibility of the other image is lowered. In another example, in the case of a mode where, if a printer's mark overlaps with another image, printing of the other image is given priority and so the overlapping printer's mark disappears and will not be printed. Therefore, in the second embodiment, processing in the case where a printer's mark overlaps with another image will be described. Since the basic flow of the processing according to the second embodiment is similar to that of the flowchart shown in FIG. 3, the following description focuses on differences from the first embodiment.

In step S305, the CPU 108, based on the position information acquired in step S304, determines whether a printer's mark overlaps the non-printing area 402 and at least one other image 802 in the printing area (see FIG. 5). If a printer's mark is added to the selected image but this printer's mark does not overlap with either the non-printing area 402 or the other image 802 in the printing area (NO in step S305), the CPU 108 adds the printer's mark to the selected image and ends the processing of this flow chart. In contrast, if a printer's mark is added to the selected image and if the printer's mark overlaps at least one of the non-printing area 402 and the other image 802 in the printing area (YES in step S305), the CPU 108 proceeds to step S306 and executes notification. After that, in step S307, the setting is changed so that the printer's mark fits within the printing area and does not overlap with another image, and the present flow chart is terminated. Specifically, the setting change is a process of moving at least one of the selected image and the other image 802 so that the printer's mark fits within the printing area and does not overlap with the other image. For example, configuration may be taken to, if a printer's mark is added to a selected image and if the printer's mark does not overlap the non-printing area 402 but overlaps the other image 802, move only the other image 802 without moving the selected image.

FIG. 5 is a diagram showing a display example of a page display area when processing according to the second embodiment is performed. In a page display area 805 indicating a state before a setting change, the selected image 401 to which a printer's mark is added overlaps with the other image 802. In this state, when the check box of the addition selection part 207 is turned on and a printer's mark is added to the selected image 401, the printer's mark overlaps with the other image 802. Therefore, in such cases, a notification for displaying a warning message 807 is executed (step S306), and the setting is changed (step S307). With FIG. 5, description has already been made for a case in which a printer's mark is added to the selected image 401 in a state in which the selected image 401 and the other image 802 overlap with each other, application of the present invention is not limited to this case. Even in the case where a printer's mark is added to the selected image 401 in a state where the selected image 401 and the other image 802 do not overlap with each other, if the printer's mark overlaps with the other image 802, the above-described notification or setting change can be performed.

A page display area 806 indicates the page display area after the setting is changed. In accordance with movement of the other image 802, even if a printer's mark is added, the selected image 401 and the other image 802 are arranged so that there is no overlap.

In the present embodiment, there is an effect that it is easy to arrange the printer's mark so as not to overlap with another image as in the state of the page display area 806.

Third Embodiment

In the case where the printing medium is roll paper, the length of the sheet in the conveying direction (vertical direction in the drawing) can be appropriately changed, unlike in the case of cut paper. Further, the application 101 can set the cutting position of the roll paper when the image displayed and edited by the application 101 or the printer's mark is printed on the roll paper. Normally, the application 101 sets, as the cutting position, a position where a predetermined margin area (corresponding to the non-printing area 402) is provided from an upstream end in the conveying direction of the printing area. Further, when the printer's mark overlaps the upstream end in the conveying direction of the non-printing area 402, the printing apparatus cuts the paper at a position where cutting is to be performed with the printer's mark as a guide, so that it is possible to omit a cutting process by a user after printing. Therefore, in the third embodiment, description is given for processing when cutting paper at the end of printing as in a case of printing on roll paper. Since the basic flow of the processing according to the second embodiment is similar to that of the flowchart shown in FIG. 3, the following description focuses on differences from the first embodiment.

When it is determined in step S305 that the printer's mark overlaps outside of the non-printing area, the CPU 108 checks which position of the non-printing area 402 the printer's mark overlaps. Then, in a case of overlapping somewhere other than a lower portion 402a of the non-printing area 402, a warning message is displayed (step S306) in accordance with the processing of the first embodiment, and then the image is moved (step S307). In contrast, when the printer's mark overlaps with the lower portion 402a of the non-printing area 402 at the lower end, a warning message 907 to that effect is displayed (step S306), and then the cutting position of the sheet is changed without moving the selected image (step S307). Specifically, the cutting position of the sheet is changed so that the sheet is cut at a position of the lower side of the selected image.

FIG. 6 is a diagram showing an example of display of a page display area according to the third embodiment. A page display area 905 indicates a state before a setting is changed. A page display area 906 indicates a state after a setting is changed. In the present embodiment, in the processing of step S307, the setting is changed so that the printer cuts the sheet at the position where cutting is to be performed after printing with the printer's mark as a guide (in other words, the lower end of the image 901).

According to the present embodiment, when an image to which a printer's mark is to be added exists at the lower portion of the printing area and overlaps with the non-printing area 402 when a printer's mark is added, the cutting position, which is the setting of the printer, is changed. By cutting the sheet at the position where an attempt to cut is being made with the printer's mark as a guide as in the state of the page display area 906, cutting at the position after printing becomes unnecessary, and there is an effect of reducing the burden of preparing the work.

Fourth Embodiment

In the fourth embodiment, as an example of changing the layout of the printer's mark when the printer's mark overlaps the non-printing area 402, a process of changing the shape or the like of the printer's mark will be described. The same components as those of the first embodiment are denoted by the same reference numerals and descriptions thereof are omitted.

FIG. 7 is a flowchart showing an example of processing according to the fourth embodiment. More specifically, FIG. 7 shows a process of performing control to, if a printer's mark overlaps with the non-printing area 402, change the type of the printer's mark so that the printer's mark fits within the printing area. For example, this flow chart is realized by the CPU 108 reading the application 101 stored in the ROM 110 into the RAM 109 and executing it. For example, the CPU 108 starts the present processing if a selection of an image to be arranged on the page display area 202 is performed from the file menu of the menu operation part 201.

Step S1001 through step S1005 are similar to step S301 through step S305. In step S1006, the CPU 108 confirms whether there is another type of printer's mark that fits within the printing area 214 (does not overlap with the non-printing area 402) and differs in shape from the original type of printer's mark. If there is no other type of printer's mark that fits within the printing area 214, similar processing as step S306 and step S307 is performed in step S1007 and step S1008. That is, the notification is executed, the position of the image is changed so that the printer's mark fits within the printing area 214.

In contrast, if there is a printer's mark that fits within the printing area 214, in step S1009, the CPU 108 makes a notification of information of another type of printer's mark that fits within the printing area. Thereafter, in step S1010, the CPU 108 changes to the other type of printer's mark that fits within the printing area, and the process ends. Note that the CPU 108 may display to a user a screen for the user to confirm whether or not it is OK to change to the other type of printer's mark that fits within the printing area in the notification in step S1009. The CPU 108 may be changed to another type of printer's mark that fits within the printing area in step S1010 when authorization for the change is obtained from the user. When authorization for the change cannot be obtained from the user, the CPU 108 may change the position of the image so that the printer's mark fits within the printing area 214 without changing the type of printer's mark.

With reference to FIG. 8, description is given for a display example of the page display area 202 and the printer's mark setting part 212 when the processing of the flowchart of FIG. 7 is executed. FIG. 8 is a view that shows a display example of a page display area and the printer's mark setting part 212 according to the fourth embodiment. A page display area 1105 shows a state in which a printer's mark protrudes into the non-printing area 402 in a state in which a corner mark 3 has been selected by the type selection part 208. At this time, since the printer's mark cannot be correctly printed with the corner mark 3, a warning message 1102 is displayed to the effect that the printing will be possible if there is a change to a corner mark 2 with which printing is possible. When the change is authorized in accordance with a user operation, the application 101 changes the printer's mark selected by the type selection part 208 to the corner mark 2. Then, the application 101 changes the printer's mark type to the corner mark 2 and displays an image 1103. As a result, the printer's mark can be printed as shown in the page display area 1106.

In the present embodiment, the type of the printer's mark is changed, but another configuration in which the shape of the printer's mark is changed so that the printer's mark fits in the printing area 214 can be adopted. For example, FIG. 9A and FIG. 9B are diagrams showing an example of changing the orientation of a printer's mark, in which FIG. 9A shows the page display area 202 before a setting change, and FIG. 9B shows the page display area 202 after the setting change. In FIG. 9A, a printer's mark 1201 extending in a widthwise direction (left-right direction in the drawing) from the image overlaps with the non-printing area 402. However, by changing the printer's mark 1201 so that it extends from the corner of the image toward the inside of the image, the changed printer's mark 1202 does not overlap with the non-printing area 402 (FIG. 9B). Such a shape change also allows the printer's mark to fit within the printing area 214. In addition, for example, by shortening the length of the printer's mark within a range that does not affect cutting, it is possible to adopt a configuration in which the printer's mark fits within the printing area 214.

According to the present embodiment, there is an effect that a user can easily select a type of printer's mark that fits within the printing area. Further, there is an effect that the printer's mark can fit within the printing area 214 without moving the image, in a case such as where another image is arranged near an image to which a printer's mark is added and there is no space to move the image to which the printer's mark is added. Note that the above first to third embodiments and the present embodiment can be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of controlling an image processing apparatus, the method comprising:
   accepting a predetermined instruction regarding a predetermined image that is being displayed on the image processing apparatus;
   changing, in a case when the predetermined instruction is accepted, so that a predetermined mark added to the predetermined image does not overlap with a non-printing area corresponding to an area where printing is not to be performed, a location of the predetermined image based on the predetermined mark, the predetermined instruction being an instruction for causing the predetermined image, to which the predetermined mark is added, to move, and the predetermined mark being added to a predetermined location in a vicinity of the predetermined image;
   executing a process of printing the predetermined image and the predetermined mark in the printing area corresponding to an area where printing is to be performed on a recording medium; and
   based on the non-printing area being positioned at the predetermined location after the predetermined image is moved to a position based on the predetermined instruction, causing the predetermined image to move.

2. The method according to claim 1, wherein the non-printing area is a margin area.

3. The method according to claim 1, wherein the predetermined instruction is an instruction for adding the predetermined mark to the predetermined image.

4. The method according to claim 3, wherein, in a case when the predetermined instruction is accepted, the predetermined mark is added to a predetermined location in a vicinity of the predetermined image,
   wherein a location of the predetermined image is changed based on the non-printing area being positioned at the predetermined location when the predetermined instruction is accepted.

5. The method according to claim 4, further comprising setting a cutting position of the recording medium on which the predetermined image and the predetermined mark added to the predetermined image are to be printed, wherein, in a case when the non-printing area, at an upstream end in a conveying direction of the recording medium, is positioned at the predetermined location when the predetermined instruction is accepted, the cutting position of the recording medium is changed without moving the predetermined image.

6. The method according to claim 4, further comprising generating a notification of a predetermined notification based on the non-printing area being positioned at the predetermined location when the predetermined instruction is accepted.

7. The method according to claim 4, wherein, even if the non-printing area is positioned at the predetermined location when the predetermined instruction is accepted, in a case when a range where the non-printing area overlaps with the predetermined location is less than or equal to a predetermined threshold, the predetermined image is not moved.

8. The method according to claim 4, wherein, in a case when the non-printing area is positioned at the predetermined location when the predetermined instruction is accepted and the predetermined image does not overlap with the non-printing area when the predetermined instruction is accepted, the predetermined image is moved.

9. The method according to claim 4, wherein the predetermined instruction is an instruction for adding a first predetermined mark to the predetermined image, and even if the non-printing area is positioned at the predetermined location when the predetermined instruction is accepted, in a case when a second predetermined mark to be added to the predetermined image does not overlap with the non-printing area, the second predetermined mark is added to the predetermined image without the predetermined image being moved and without adding the first predetermined mark to the predetermined image.

10. The method according to claim 1, wherein the recording medium is roll paper.

11. The method according to claim 1, wherein, in a case when the predetermined instruction is accepted, so that the predetermined mark added to the predetermined image does not overlap with the non-printing area, the predetermined image is moved without a change in size based on the predetermined mark.

12. The method according to claim 1, wherein, in a case when the predetermined instruction is accepted, so that the predetermined mark added to the predetermined image does not overlap with another image that differ from the predetermined image, at least one of a location of the predetermined image and a location of the another image is changed based on the predetermined mark.

13. The method according to claim 1, wherein the predetermined mark is a mark of a printer.

14. The method according to claim 1, wherein the process of printing the predetermined image and the predetermined mark is a process of causing a printer driver to create print data based on an output image data including the predetermined image and the predetermined mark.

15. The method according to claim 1, wherein, in a case when the process of printing the predetermined image and the predetermined mark is executed, printing the predetermined image and the predetermined mark is executed by a printer external to the image processing apparatus.

16. The method according to claim 1, wherein, in a case when the predetermined instruction is accepted, so that the predetermined mark added to the predetermined image does not overlap with the non-printing area, a location of the predetermined image is changed based on position information of the predetermined mark.

17. A method of controlling an image processing apparatus, the method comprising:

accepting a predetermined instruction regarding a predetermined image that is being displayed on the image processing apparatus;

changing, in a case when the predetermined instruction is accepted, so that a predetermined mark added to the predetermined image does not overlap with a non-printing area corresponding to an area where printing is not to be performed, a location of the predetermined image based on the predetermined mark, the predetermined instruction being an instruction for adding the predetermined mark to the predetermined image, and, in a case when the predetermined instruction is accepted, the predetermined mark is added to a predetermined location in a vicinity of the predetermined image; and executing a process of printing the predetermined image and the predetermined mark in the printing area corresponding to an area where printing is to be performed on a recording medium, wherein a location of the predetermined image is changed based on the non-printing area being positioned at the predetermined location when the predetermined instruction is accepted.

18. The method according to claim 17, further comprising setting a cutting position of the recording medium on which the predetermined image and the predetermined mark added to the predetermined image are to be printed, wherein, in a case when the non-printing area, at an upstream end in a conveying direction of the recording medium, is positioned at the predetermined location when the predetermined instruction is accepted, the cutting position of the recording medium is changed without moving the predetermined image.

19. The method according to claim 17, further comprising generating a notification of a predetermined notification based on the non-printing area being positioned at the predetermined location when the predetermined instruction is accepted.

20. The method according to claim 17, wherein, even if the non-printing area is positioned at the predetermined location when the predetermined instruction is accepted, in a case when a range where the non-printing area overlaps with the predetermined location is less than or equal to a predetermined threshold, the predetermined image is not moved.

21. The method according to claim 17, wherein, in a case when the non-printing area is positioned at the predetermined location when the predetermined instruction is accepted and the predetermined image does not overlap with the non-printing area when the predetermined instruction is accepted, the predetermined image is moved.

22. The method according to claim 17, wherein the predetermined instruction is an instruction for adding a first predetermined mark to the predetermined image, and even if the non-printing area is positioned at the predetermined location when the predetermined instruction is accepted, in a case when a second predetermined mark to be added to the predetermined image does not overlap with the non-printing area, the second predetermined mark is added to the predetermined image without the predetermined image being moved and without adding the first predetermined mark to the predetermined image.

23. A method of controlling an image processing apparatus, the method comprising:
- accepting a predetermined instruction regarding a predetermined image that is being displayed on the image processing apparatus;
- changing, in a case when the predetermined instruction is accepted, so that a predetermined mark added to the predetermined image does not overlap with a non-printing area corresponding to an area where printing is not to be performed, a location of the predetermined image based on the predetermined mark; and
- executing a process of printing the predetermined image and the predetermined mark in the printing area corresponding to an area where printing is to be performed on a recording medium,
- wherein, in a case when the predetermined instruction is accepted, so that the predetermined mark added to the predetermined image does not overlap with another image that differ from the predetermined image, at least one of a location of the predetermined image and a location of the other image is changed based on the predetermined mark.

* * * * *